United States Patent
Dai et al.

(10) Patent No.: US 9,638,905 B1
(45) Date of Patent: May 2, 2017

(54) OPTICAL FILM AND NARROW FRAME DISPLAY DEVICE

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Yung-Lun Huang, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/984,228

(22) Filed: Dec. 30, 2015

(30) Foreign Application Priority Data

Nov. 27, 2015  (TW) .............................. 104139643 A

(51) Int. Cl.
  *G02B 17/00*    (2006.01)
  *G02B 17/08*    (2006.01)
  *F21V 3/00*    (2015.01)

(52) U.S. Cl.
  CPC .............. *G02B 17/086* (2013.01); *F21V 3/00* (2013.01)

(58) Field of Classification Search
  CPC ..................................................... G02B 17/086
  USPC .......................................................... 359/728
  See application file for complete search history.

(56) References Cited

U.S. PATENT DOCUMENTS

2009/0154197 A1* 6/2009 Sun ...................... G02B 5/0221
                                                          362/618

* cited by examiner

*Primary Examiner* — James Jones
(74) *Attorney, Agent, or Firm* — Steven Reiss

(57) ABSTRACT

A light-redirecting optical film includes a continuous plurality of micro structures. The micro structures have a common bottom surface and each micro structure includes a first curved surface and a second curved surface. The first curved surface is convex towards the second curved surface. The second curved surface rises from the bottom surface. The first curved surface and the second curved surface meet along a top edge. The curvature of the top edges in the optical film is the same. The first curved surface is a total reflecting surface. A narrow frame display device is also presented.

13 Claims, 6 Drawing Sheets

OPTICAL FILM AND NARROW FRAME DISPLAY DEVICE

FIELD

The subject matter herein generally relates to a display devices.

BACKGROUND

Large size display devices are widely used. A number of display units can be spliced together to form a single large size display device. Every display unit has at least one frame which interrupts the image and thus affects the continuity of the image.

BRIEF DESCRIPTION OF THE DRAWINGS

Implementations of the present technology will now be described, by way of example only, with reference to the attached figures.

DETAILED DESCRIPTION

Figure 1:
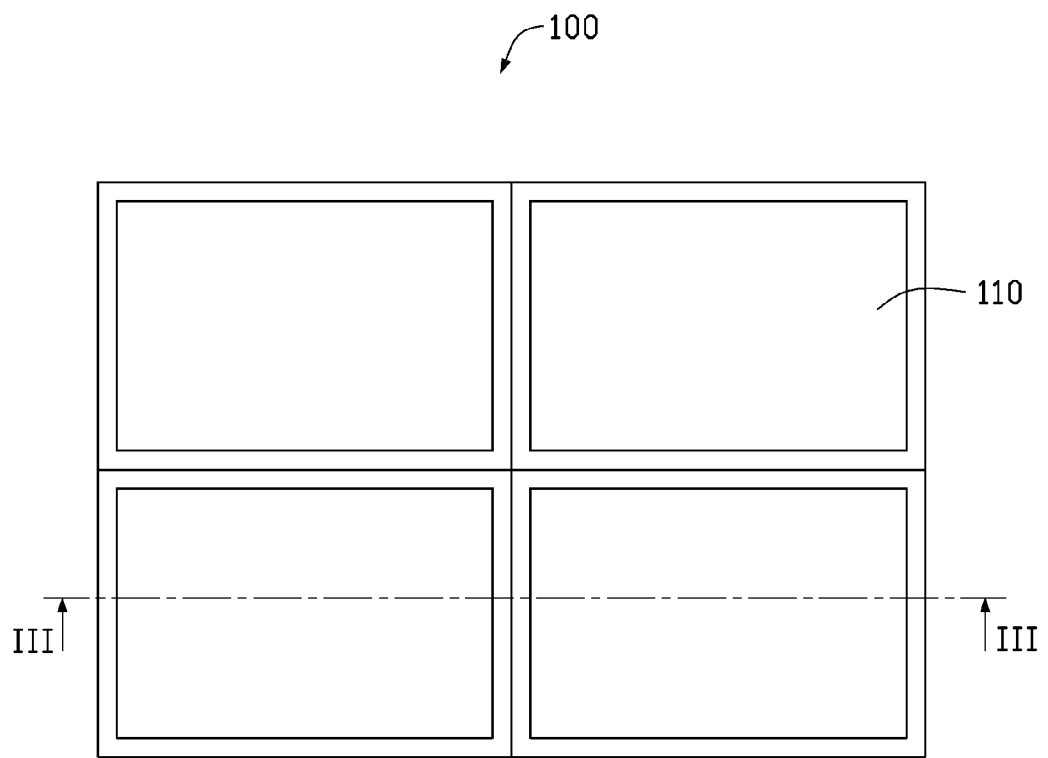
FIG. 1 is a plan view of a narrow frame display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A plurality of definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an optical film and a narrow frame display device.

FIG. 1 illustrates a narrow frame display device 100. The display device 100 includes a plurality of display units 110. The plurality of display units 110 collectively define an array with no gap (frameless) between display units 110. In the illustrated embodiment, the frameless display device 100 includes four display units 110 positioned in a 2×2 array. In other embodiments, the amount of display units 10 is not limited to four.

In the illustrated embodiment, the display unit 110 is a liquid crystal display unit. In other embodiments, the display unit 110 can be a plasma display unit.

Figure 2:
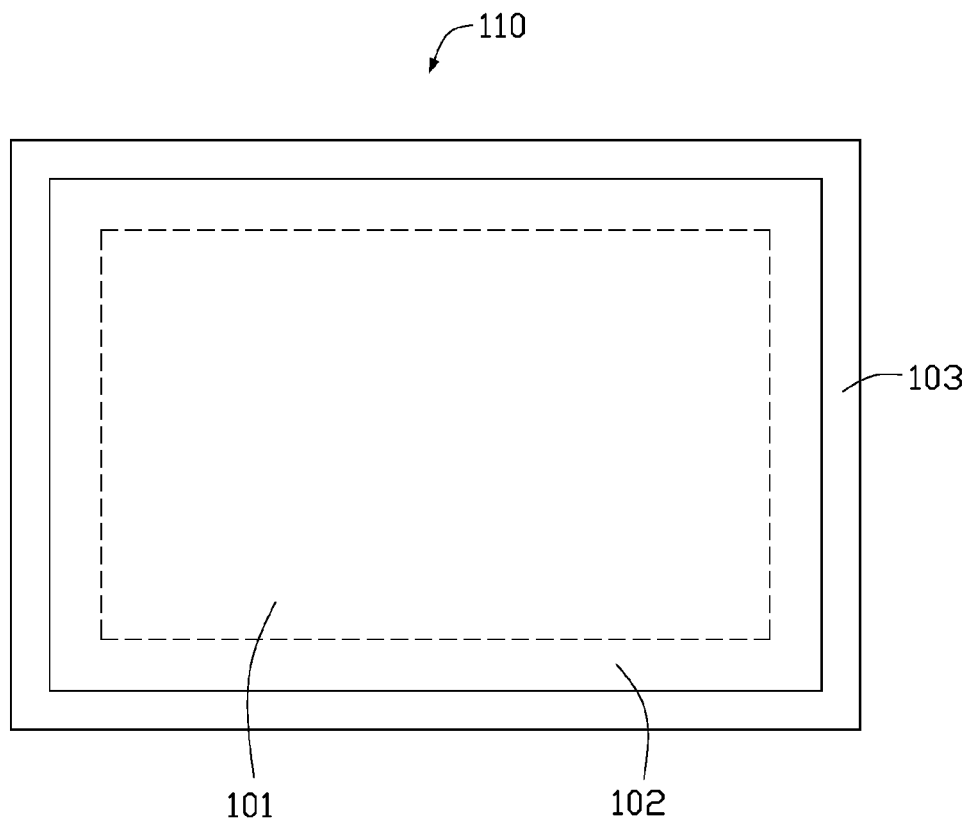
FIG. 2 is a display unit of the narrow frame display device in FIG. 1.

FIG. 2 illustrates the display unit 110 having a central area 101, a fringe area 102 surrounding the central area 101 and a frame area 103 surrounding the fringe area 102.

Figure 3:
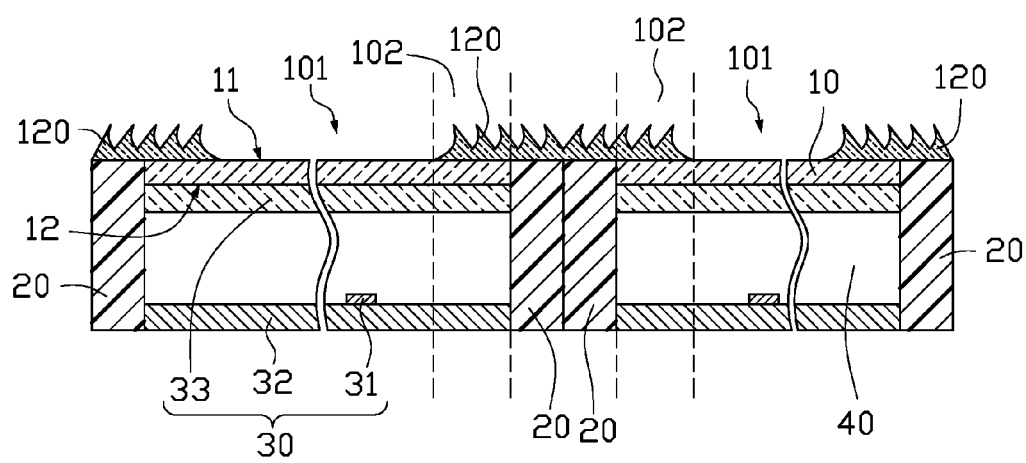
FIG. 3 is a cross-sectional view taken along line III-III in FIG. 1.

FIG. 3 illustrates that the display unit 110 includes a display panel 10, a frame 20, and a backlight module 30.

The display panel 10 includes a display surface 11 and a non-display surface 12 opposite to the display surface 11. The display surface 11 displays images. The display panel 10 corresponds to the central area 101 and the fringe area 102.

The frame 20 is installed on the edge of the display panel 10 and surrounds the display panel 10. The frame 20 corresponds to the frame area 103 and is used to fix and support the display panel 10. The frame 20 can be made of opaque resin material. The color of the frame 20 can be black.

The backlight module 30 includes a number of backlights 31, a printed circuit board 32, and a diffusion plate 33. The printed circuit board 32 corresponds to the non-display surface 12. The display panel 10, the frame 20, and the printed circuit board 32 collectively define a space 40. The backlights 31 and the diffusion plate 33 are fixed in the space 40.

The backlights 31 are uniformly fixed on the printed circuit board 32 and electrically connected to the printed circuit board 32. The backlights 31 can be light emitting diodes, laser diodes, lamp, Cold Cathode Fluorescent Lamp (CCFL), Hot Cathode Fluorescent Lamp (HCFL), Vacuum Fluorescent Display (VFD), Field Emission Display (FED), and the like.

The diffusion plate 33 is fitted closely to the non-display surface 12 and is aligned with the backlights 31. The diffusion plate 33 diffuses and transmits light from the backlights 31. In the illustrated embodiment, the printed circuit board 32 is fixed below the display panel 10 by the frame 20. In other embodiments, the printed circuit board 32 can be fixed in other locations so long as the printed circuit board 32 is electrically connected to the backlights 31. In the illustrated embodiment, the diffusion plate 33 is fixed by the frame 20. In other embodiments, the diffusion plate 33 can be fixed by supporting structure (not shown).

The narrow frame display device 100 includes a plurality of optical films 120. The optical films 120 are formed on the surface of the display units 110. In the illustrated embodiment, the optical films are formed on the display surface 11. In other embodiments, if the display unit 110 further includes a hyaline glass cover which is used to protect the display panel 10, the optical films 120 also can be formed on the hyaline glass cover.

The optical film 120 corresponds to the fringe area 102 and the frame area 103. The four optical films 120 formed on one display unit 110 are substantially symmetrical about horizontal and vertical lines which meet in the center. The two optical films 120 formed on two different and adjacent display units 110 are essentially one-piece and substantially symmetrical about the line of contact between the two.

Figure 4:
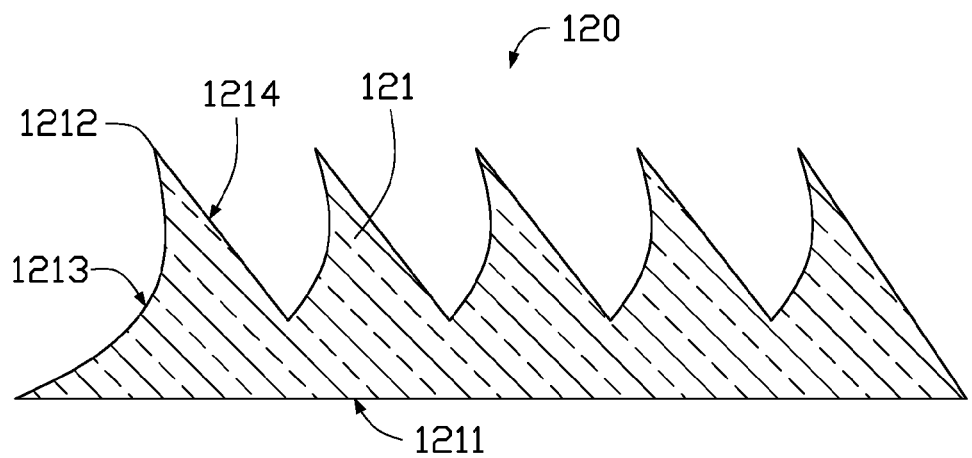
FIG. 4 is a cross-sectional view of optical film 120 shown in FIG. 3.
Figure 5:
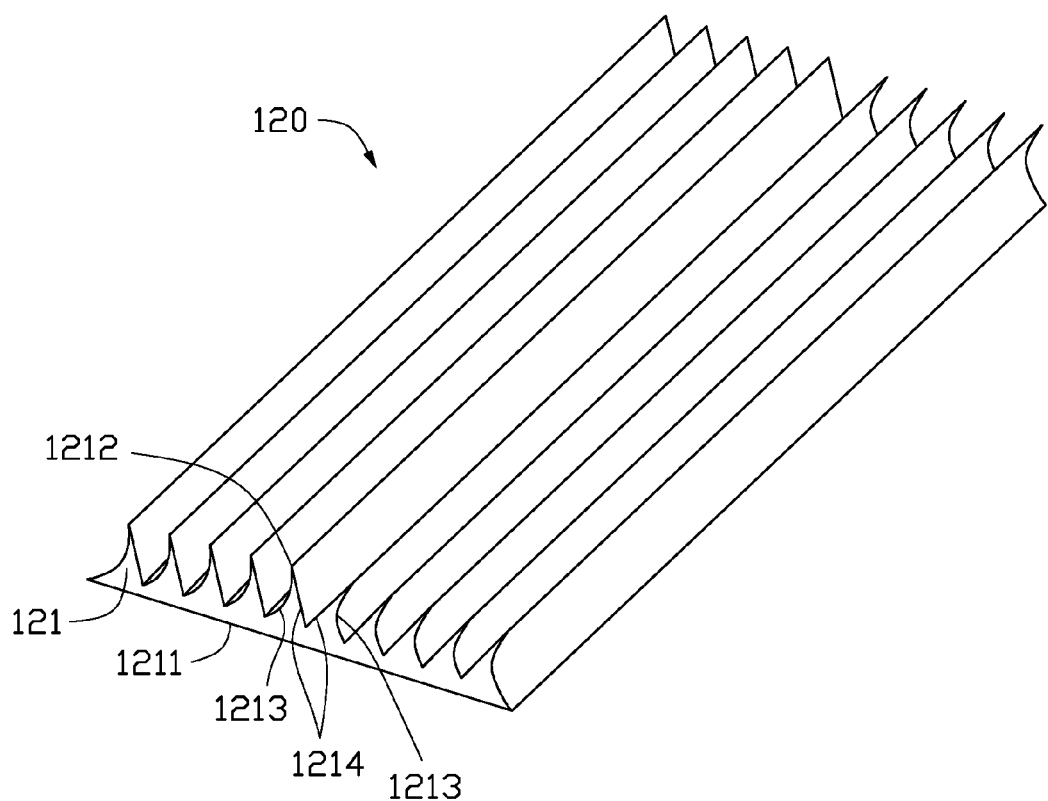
FIG. 5 is an isometric view of two optical films in FIG. 4, adjacent and integrated.

FIG. 4 and FIG. 5 illustrate that every optical film 120 includes a plurality of micro structures 121. The micro structures 121 are continuous. The optical films 120 have a common bottom surface 1211. Every micro structure 121 includes a first curved surface 1213 and a second curved surface 1214. The first curved surface 1213 is convex in relation to the second curved surface 1214. The second curved surface 1214 rises from the bottom surface 1211. The first curved surface 1213 and the second curved surface 1214 meet and define a top 1212 at the line of meeting. The curved direction of the tops 1212 in every optical film 120 is the same. The first curved surface 1213 is a total reflecting surface. In the illustrated embodiment, there is a single radius of curvature of the first curved surface 1213, which is 10 micrometers. In other embodiments, the radius of curvature of the first curved surface 1213 is not limited to being single, nor to a distance of 10 micrometers.

Figure 6:
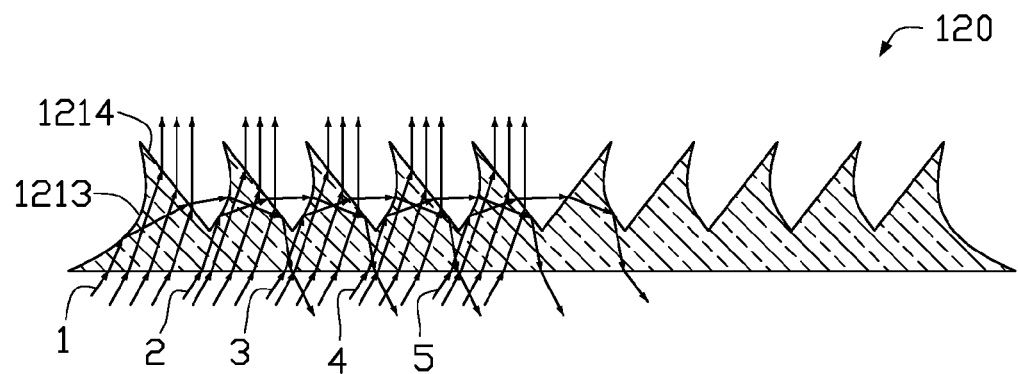
FIG. 6 is a cross-sectional view diagrammatically illustrating light passing through the optical film of FIG. 3.

FIG. 6 illustrates that when incident light rays 1, 2, 3, 4, 5 emitted from the backlights 31 are projected to the first curved surface 1213, the incident light rays 1, 2, 3, 4, 5 are totally reflected and then refracted by the other first curved surfaces 1213 and by the second curved surfaces 1214, then some light is emitted through the bottom surface 1211. That is to say, some light through the first curved surface 1213 is not directed into eyes of the observer. Therefore, the light into the eyes of the observer is decreased. Thus, the observer will feel that the fringe area 102 is less bright in the fringe area 102 of the display unit 110. The light shooting out from the display panel 10 is refracted by the second curved surface 1214 and then the refracted rays will shoot out from the second curved surface 1214 perpendicularly. Refracted by the second curved surface 1214, the light emitted from the second curved surface 1214 will be deflected to the axis of symmetry of the two adjacent display units 110; the light from the second curved surface 1214 will cover the frame 20 partly or completely and will make the frame 20 invisible or inconspicuous at normal viewing angles.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. A narrow frame display device comprising:
   a plurality of display units collectively defining an array with no gap between the plurality of display units; each of the display units comprising:
   a display panel comprising a display surface and a non-display surface opposite to the display surface;
   a frame being formed on the edge of the display panel and surrounding the display panel; and
   a backlight module corresponding to the non-display surface;
   wherein the display units further comprises a central area, a fringe area surrounding the central area and a frame area surrounding the fringe district, the frame corresponds to the frame district, and the display panel corresponds to the central area and the fringe area; and
   a plurality of optical films being defined on the surface of the display units and corresponding to the frame district and the fringe district, each of the optical films comprising:
   a plurality of micro structures being continuous and having a common bottom surface, every micro structure comprising a first curved surface and a second curved surface, the first curved surface being convex in relation to the second curved surface, and the second curved surface rising from the bottom surface;
   wherein the first curved surface and the second curved surface meet and define a top at the line of meeting, the curved direction of the tops in the optical film being the same, and the first curved surface being a total reflecting surface.

2. The narrow frame display device of claim 1, wherein there is a single radius of curvature of the first curved surface, which is 10 micrometers.

3. The narrow frame display device of claim 1, wherein the four optical films formed on one display unit are substantially symmetrical about horizontal and vertical lines which meet in the center.

4. The narrow frame display device of claim 1, wherein the two optical films formed on two different and adjacent display units are essentially one-piece and substantially symmetrical about the line of contact between the two.

5. The narrow frame display device of claim 1, wherein the optical films are defined on the display surface.

6. The narrow frame display device of claim 1, wherein the display unit further comprises a hyaline glass cover which is used to protect the display panel, the optical films are defined on the hyaline glass cover.

7. The narrow frame display device of claim 1, wherein the backlight module comprises a number of backlights, a printed circuit board and a diffusion plate; the printed circuit board corresponds to the non-display surface; the display panel, the frame and the printed circuit board collectively define a space; and the backlights and the diffusion plate are all fixed in the space.

8. The narrow frame display device of claim 7, wherein, the backlights are uniformly fixed on the printed circuit board and electrically connected to the printed circuit board.

9. The narrow frame display device of claim 7, wherein, the diffusion plate is fitted closely to the non-display surface and is aligned with the backlights.

10. The narrow frame display device of claim 7, wherein, the printed circuit board is fixed below the display panel by the frame.

11. The narrow frame display device of claim 7, wherein, the diffusion plate is fixed by supporting structure.

12. The narrow frame display device of claim 7, wherein, the frame is made of opaque resin material.

13. The narrow frame display device of claim 12, wherein, the color of the frame is black.

* * * * *